Feb. 24, 1970

J. B. STEARNS 3,497,769

NON-CONSUMABLE ELECTRODE WELDING BY AN
UNSATURATED VARIABLE REACTOR

Filed May 9, 1967

INVENTOR:
JAMES B. STEARNS

BY: James E. Milley
Daniel D. Fetterley
ATTORNEYS

INVENTOR:
JAMES B. STEARNS
BY: James E. Nilles
Daniel D. Fetterley
ATTORNEYS

Feb. 24, 1970 J. B. STEARNS 3,497,769
NON-CONSUMABLE ELECTRODE WELDING BY AN
UNSATURATED VARIABLE REACTOR
Filed May 9, 1967 3 Sheets-Sheet 3
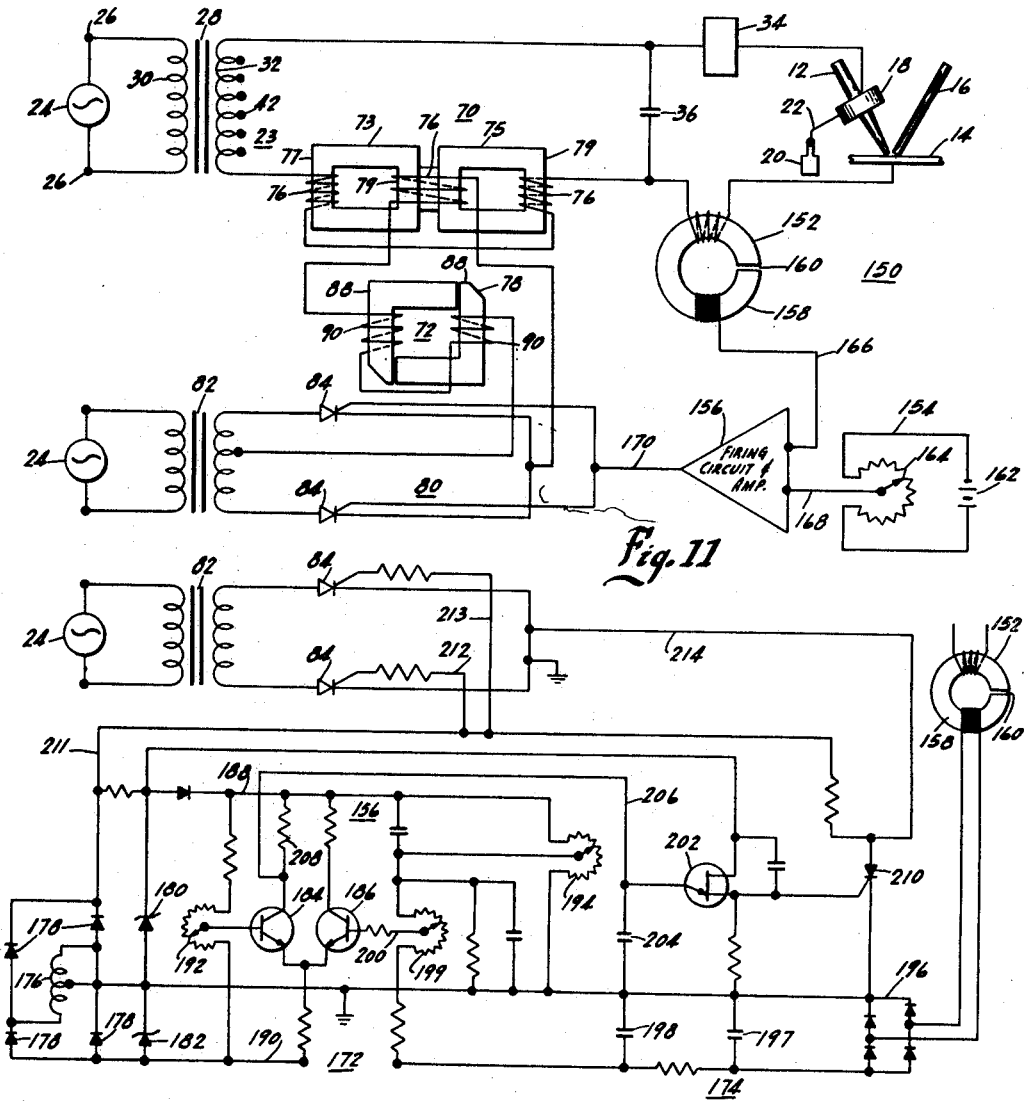
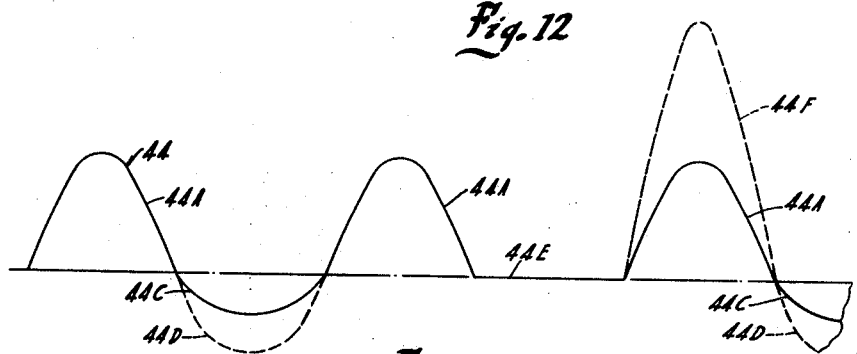
INVENTOR:
JAMES B. STEARNS
BY: James E. Nilles
Daniel D. Fetterley
ATTORNEYS 3,497,769
NON-CONSUMABLE ELECTRODE WELDING BY AN UNSATURATED VARIABLE REACTOR
James B. Stearns, Elm Grove, Wis., assignor to Harnischfeger Corporation, West Milwaukee, Wis., a corporation of Wisconsin
Filed May 9, 1967, Ser. No. 637,169
Int. Cl. H05b 41/16
U.S. Cl. 315—284
11 Claims

ABSTRACT OF THE DISCLOSURE

A welding power supply suitable for non-consumable electrode alternating current welding.—Current wave stability may be provided by the inclusion, in the power supply, of a means to insure that a current regulating saturable reactor remains unsaturated while in the current limiting state under all operating conditions of the power supply, thereby to limit the current and provide stability to the current wave. Long term current stability is also provided by a current regulator.

A method for non-consumable electrode alternating current welding.—Current wave stability may be provided to the process by retaining a current limiting means such as a saturable reactor in the unsaturated condition when the reactor is in the current limiting state so as to limit the current and provide stability to the current wave. Long term current stability is also provided by regulating the current to a desired value.

BACKGROUND OF THE INVENTION

Field of the invention

The present invention relates to the field of non-consumable electrode alternating current welding.

Description of the prior art

Non-consumable electrode welding may employ a tungsten electrode to establish an arc between the electrode and a work piece in response to the application of alternating current thereto. The arc melts the work piece, forming a puddle, to which is added, by hand or machine, filler metal to complete the weld. The puddle is often shielded by inert gas to reduce impurities in the weld. Such a welding process is commonly known as tungsten-inert gas welding or simply TIG welding.

During such a welding process, there is a natural tendency for the arc to rectify the alternating current wave form applied to the electrode and the work piece, as the alternating current flows with greater ease from the electrode to the work piece than from the work piece to the electrode. At times, the rectifying effect of the arc is sufficient to block the flow of current from the work piece to the electrode, interrupting the current wave.

The above described phenomenon is due to the dissimilarity of materials employed in the process and to the differing electron emission characteristics of such materials. Thus, the tungsten electrode readily emits electrons in response to the application of electrical energy thereto and permits the current to flow with great ease from the electrode to the work piece. The work piece, on the other hand, generally has much lower electron emission characteristics which impede the flow of current from the work piece to the electrode. In many cases, the current carriers necessary to provide the work piece to electrode current flow are obtained by ionization of the metallic oxides produced during the welding process.

In cases in which the power supply employed in the welding process utilizes a saturable reactor variable impedance to regulate the welding current, the interruption in the current wave prevents resetting of the saturable reactor so that when the current wave resumes, the reactor is driven into saturation when in the current limiting state and excessive transient welding current results. This short term current instability caused by failure of the saturable reactor to reset, due to the half cycle interruption in the welding current, is often coupled with long term current instability due to machine warmup and line voltage variations.

The aforementioned current instabilities cause a phenomenon known as "tungsten spitting" in which small portions of the electrode break off and are injected into the weld. This causes expensive erosion of the electrode as well as contaminating the weld.

SUMMARY OF THE PRESENT INVENTION

It is an object of the present invention to provide an improved welding method and power supply means which overcomes the aforesaid difficulties and impracticalities and forms superior welds.

The welding means and method of the present invention provides for the elimination of tungsten spitting by providing stability against excessive transient, or short term, currents to the current wave. Such stability may be provided by retaining the current limiting saturable reactor in the unsaturated condition when the reactor is in the current limiting state under all operating conditions, including those conditions in which the current wave is interrupted by the rectifying action of the arc.

Means are provided in the welding power supply to retain the saturable reactor in such an unsaturated condition thereby eliminating the none-too-satisfactory resistive current limiting devices incorporated in prior art power supplies.

Current instability due to longer term causes, such as power supply warm up, and line voltage variations, is prevented by current regulation which insures that the actual welding current approaches the desired welding current.

A regulator means, including a linear current feedback signal means and a current reference signal means, is included in the welding power supply.

BRIEF DESCRIPTION OF THE DRAWINGS

FIGURE 7 is a graph showing an alternating current wave form including current instabilities occurring during the welding process;

FIGURE 11 is a general schematic diagram of another embodiment of the welding power supply of the present invention having a means to regulate the welding current; and FIGURE 12 is a detailed schematic diagram of the embodiment of FIGURE 11.

DESCRIPTION OF THE PREFERRED EMBODIMENTS

Figure 1:
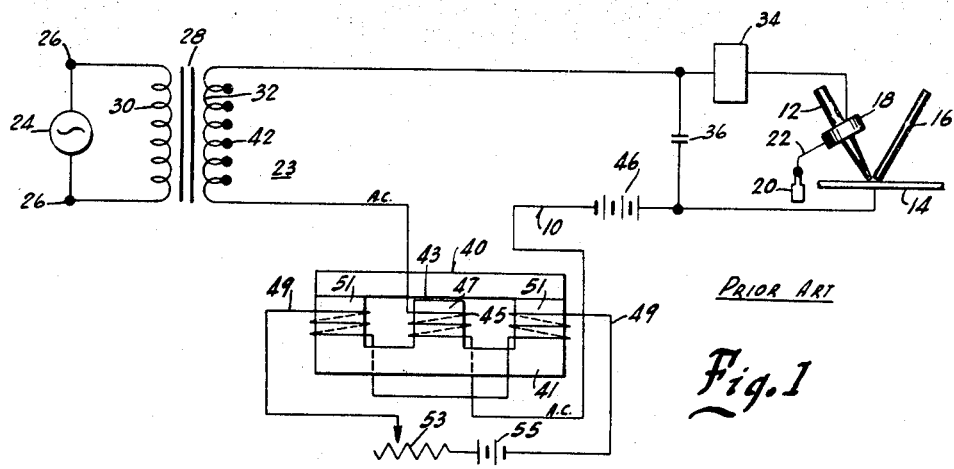
FIGURE 1 is a schematic diagram of prior art welding power supply.

Referring now to FIGURE 1, a prior art consumable electrode welding apparatus is shown therein, indicated generally by the numeral 10. The apparatus includes a non-consumable electrode, for example, tungsten electrode 12, for establishing an arc between work piece 14 and the electrode. Filler metal 16 is added to the weld puddle formed by the arc between electrode 12 and work piece 14. The puddle may be shielded from the atmosphere by inert gas supplied to collar 18 on electrode 12 from tank 20 by pipe 22.

The arc between electrode 12 and work piece 14 is generated by an alternating current power source, shown diagrammatically as single phase alternator 24, which supplies alternating current to terminals 26 of welding power supply 23. The welding power supply 23 includes a transformer 28, having primary windings 30 connected to terminals 26 to provide a current wave of alternately bi-directional half cycles to electrode 12 and work piece 14 by means of secondary winding 32. The secondary circuit of transformer 26 may include a high frequency generator 34 in series with electrode 12 and work piece 14. Generator 34, which may be a spark gap generator, aids in the reignition of the arc between electrode 12 and work piece 14 by superimposing a high frequency signal on the current wave. A stabilizing capacitor 36 may be connected in parallel with electrode 12 and work piece 14. Transformer 28 may contain taps 42 on the windings to vary the voltage to a desired level.

A means to vary the current magnitude to the desired level, such as saturable reactor 40, may be provided in welding power supply 23. Saturable reactor 40 includes core 41 having air gap 43 which provides the desired wave shape to the current wave. A load winding 45 is mounted on center leg 47 of core 41 while a control winding 49 is mounted on each of outer legs 51. Control windings 49 are energized by a direct current source shown diagrammatically as resistor 53 and battery 55 so as to control the level of the current wave generated by transformer 28.

Figure 2:
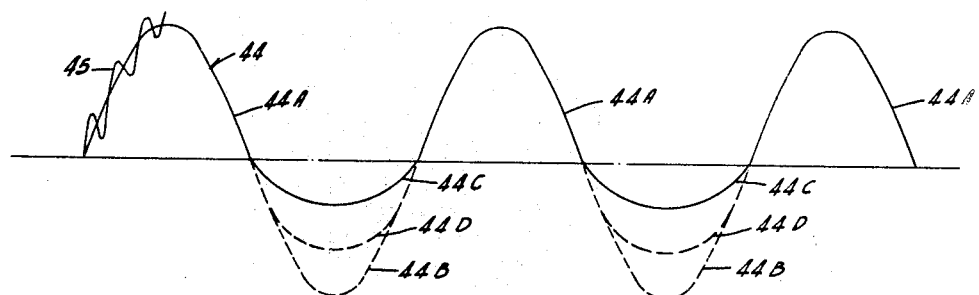
FIGURE 2 is a graph showing the alternating current wave utilized in alternating current welding processes.

As shown in FIGURE 2, alternating current power source 26 and transformer 28 generate current wave 44. This current wave is of the normal, balanced, sinusoidal character of alternating current and contains half cycles of one direction of current flow, the magnitude of which is shown by the area under graph 44A, and half cycles of the other direction of current flow, the magnitude of which is shown by the area under graph 44B. These half cycles of current flow are equal in magnitude to each other so that the ratio of the current magnitude of alternate half cycle 44A to the current magnitude of alternate half cycle 44B is one to one. By way of example, the current flow of alternate half cycle 44A may represent arc current flowing from electrode 12 to work piece 14 while alternate half cycle 44B represents current flow from work piece 14 to electrode 12. Current wave 44 may have superimposed thereon high frequency signal 45 from high frequency generator 34.

When applied to electrode 12 and work piece 14 during the welding process, current wave 44 generates an arc between the electrode and the work piece. Current wave 44 is unbalanced due to the fact the current passes more easily from electrode 12 to work piece 14 than from work piece 14 to electrode 12. This tends to reduce the magnitude of alternate half cycle 44B to the magnitude shown by the graph 44C. The current magnitude ratio between the current represented by graph 44A and the current represented by graph 44C becomes approximately 3 to 1.

Figure 4:
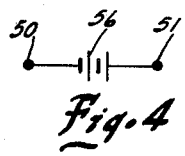
FIGURE 4 is a partial schematic diagram of a circuit element that may be incorporated in the embodiment of FIGURE 3.
Figure 5:
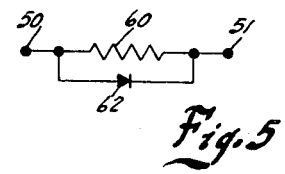
FIGURE 5 is a partial schematic diagram of another circuit element that may be incorporated in the embodiment of FIGURE 3.
Figure 3:
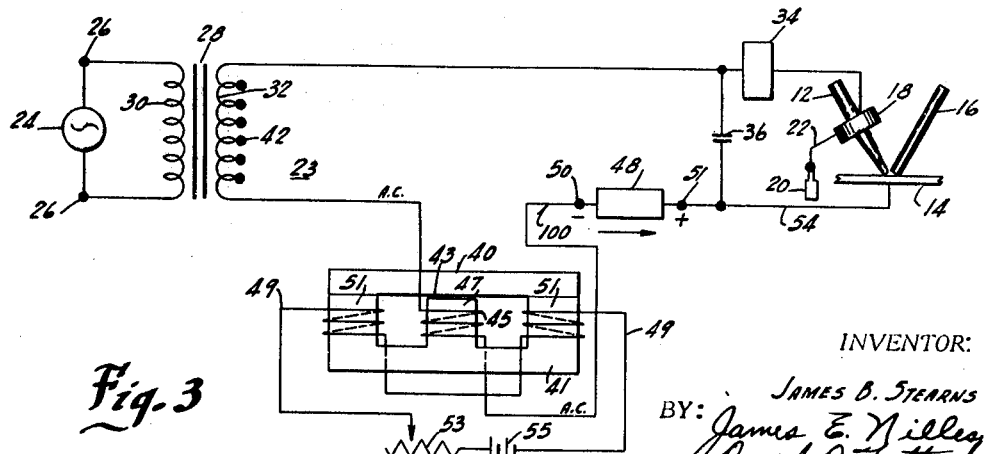
FIGURE 3 is a schematic diagram of another welding power supply.

To overcome this unbalance, prior art power supplies have generally included a means to supply a sufficient direct current bias to half cycles 44C to restore them to the magnitude of the half cycles indicated by 44B. For example, battery 46 may be connected in series with transformer 28 in a manner to aid the flow of current from work piece 14 to electrode 12 during half cycle 44C, thus restoring these half cycles to the magnitude of half cycle 44B and returning the current magnitude ratio of half cycles 44A to half cycles 44B to 1 to 1. FIGURE 3 shows a welding power supply having a bias means 48 which may be, for example, the battery of FIGURE 4 or the resistor-diode circuit of FIGURE 5.

Figure 6:
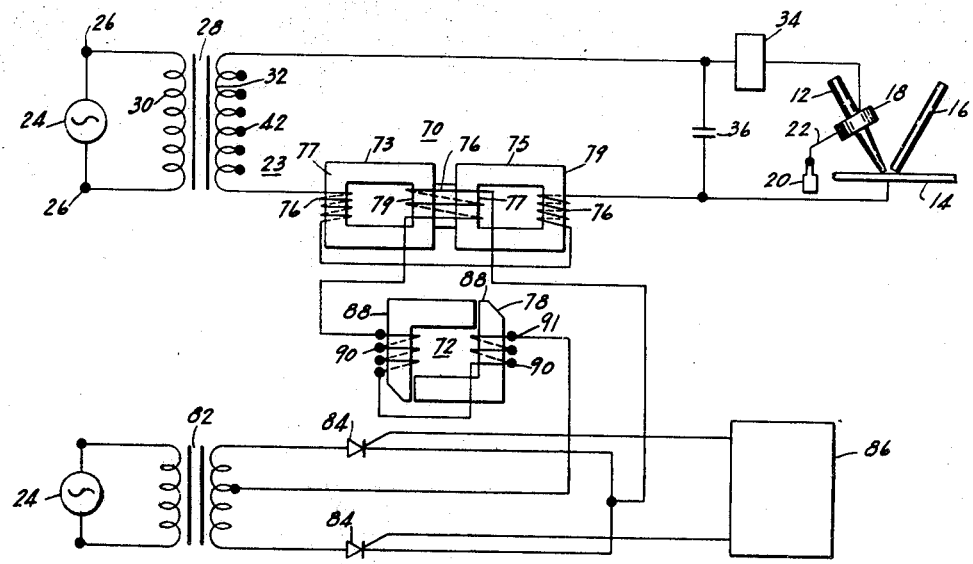
FIGURE 6 is a schematic diagram of another embodiment of a welding power supply.

In the welding power supply 23 of FIGURE 6, saturable reactor 70, having inductance 72 in the control circuit thereof, is utilized to control the magnitude of the welding current.

As is well known in the art, saturable reactor 70 is a circuit element of controllable impedance. The reactor includes iron cores 73 and 75 of hollow rectangular construction. Although cores 73 and 75 have, in the past, required air gaps to provide the desired wave shape, it has been found that in the presently preferred embodiment of the present invention a core without air gaps may be utilized. This increases the range of currents over which saturable reactor 70 may operate. Load windings 74 are wound on legs 77 and 79 of cores 73 and 75 and are connected in series with work piece 14 and electrode 12, so that one of the cores provides a current limiting impedance, or is the current limiting state, for each half cycle of alternating current wave 44. Control winding 76 is wound so as to surround adjacent legs 81 and 83 of the cores and is connected to a source of control current 80.

In operation, the impedance of saturable reactor 70 may be controlled by adjusting the magnitude of the current in control winding 76 so as to vary the magnetic flux conditions in cores 73 and 75. With a large current in control winding 76, the core flux is high and the impedance of load windings 74 is low. A large welding current is thus supplied to work piece 14 and electrode 12.

When the current in the control winding 76 is reduced, the core flux decreases, the impedance of load winding 74 increases and the current to work piece 14 and electrode 12 is reduced. Thus, by varying the current in control winding 76, the welding current from welding power supply 23 may be adjusted to the desired level.

An adjustable inductor or choke 72 may be included in the control circuit 80 providing current to saturable reactor control winding 76. Control circuit 80 may include a source of direct current such as center tapped transformer 82 connected to alternating current power source 24 and to controlled rectifiers 84. In addition to rectifying the alternating current from alternating power source 26 into direct current, controlled rectifiers 84 may control the magnitude of the direct current through adjustment of their conduction interval, as by firing circuit 86. Firing circuit 86 applied firing signals to the rectifiers to render them conductive at the desired points in the alternating current cycle of alternating current power supply 24. Other sources of direct current may, of course, be used.

A typical adjustable inductor 72 may comprise a pair of L-shaped members 88 juxtapositioned to form a rectangle as shown in FIGURE 6. A small air gap, the size of which may be adjusted, exists between the adjacent portions of members 88. Each of members 88 contains a winding 90, the two windings being connected in series with each other and in series with the control winding 76 and control circuit 80.

By way of example, in a typical inductor 72 operating at a 60 ampere D.C. level, members 88 are approximately 5½ inches long and have a cross sectional area of 2½ inches. 140 turns of wire are provided on each member. The air gap between adjacent portions of the members 88 is .01 inch.

It will be appreciated that the inductance and saturation point of inductor 72 may be varied in other ways than by adjustment of the air gaps between the members. For example, the air gap may be held constant and windings 90 provided with taps 91 which may be used to vary the number of turns in windings 90. In the alternative, the shape and size of members 88 may be varied to adjust the inductance of inductor 72.

Referring to FIGURE 7, the unbalanced current wave resulting from the natural rectifying action of the arc between electrode 12 and work piece 10 when power supply 23 is operated is shown therein. The current wave thus consists of alternate half cycles 44A and alternate half cycles 44C or alternate current half cycles 44D, depending on the unbalance of current wave 44. Due to aberrations occurring during the welding process, the natural rectification of the arc may occasionally be so great as to fully and completely block current flow from work piece 14 to electrode 12, interrupting the current wave and producing an interval of zero current 44E between alternate half cycles 44A. Such an interruption in the current wave causes the next alternating half cycle 44A to be of excessive current magnitude, as shown in FIGURE 7 by the graph 44F because the interruption of the current wave prevents the reactor from resetting. It is this excessive current half cycle 44F that causes tungsten spitting during the welding process.

Figure 8:
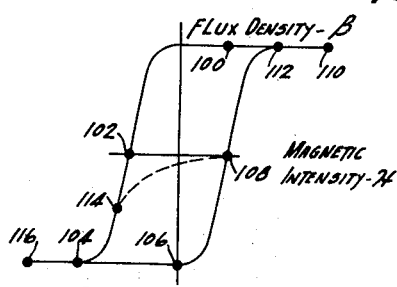
FIGURE 8 is a graph showing the hysteresis loop of a saturable reactor employed in welding supplies.
Figure 10:
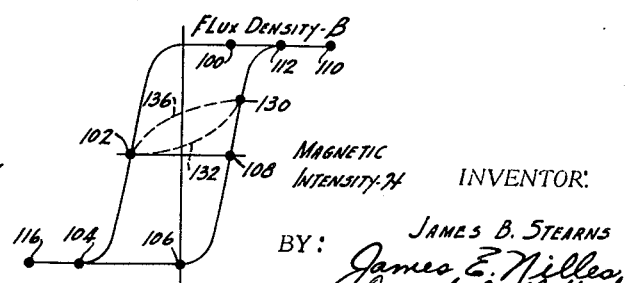
FIGURE 10 is a graph showing the hysteresis loop of a saturable reactor incorporated in a welding power supply and in particular showing the retention of the saturable reactor in the unsaturated state.

The production of excessive current half cycle 44F may be more fully understood by reference to FIGURE 8, which shows a typical hysteresis loop for core 73 or 75 of saturable reactor 70 operating at 100,000 lines per square inch in the unsaturated condition. Assuming normal operation of saturable reactor 70, that is, operation with the current wave shown in FIGURE 2 and comprised of half cycle 44A and alternating half cycle 44C or 44D, during the time core 73 is impeding current flow, the magnetic condition of core 73 will trace a pattern starting at point 100 and moving along the hysteresis loop through points 102, 104, 106 to point 108. This may occur, for example, when alternating current half cycle 44A of the current wave is present in load windings 76. Point 108 is the magnetic flux condition established by the current in control winding 76. During alternate half cycle 44B of current wave 44, when core 75 is impeding current flow, the condition of core 73 will move from point 108 through points 110, 112, back to point 100, thus completing the hysteresis loop. Core 73 will present little impedance to the current of half cycle 44B but core 75 will act to limit the current to the desired value so that the level of the current wave and the welding current remains at the desired value.

Considering now the operation of saturable reactor 70 under the conditions shown in FIGURE 7, and including the interrupted portion of current wave 44E, the condition of core 73 during alternate half cycle 44A will be the same as described above and at the end of the half cycle, the condition of core 73 will be at point 108. However, as the next half cycle does not appear, due to interruption 44E, the condition of core 73 remains at point 108. During the alternate half cycle 44A subsequent to interruption 44E, the magnetic condition of core 73 will change from point 108 through 114, 104, 116, 106, and back to point 108. As the portion of the loop from point 104 through point 116 to point 106 offers very little impedance, due to the saturation of core 73, the surge in the current wave identified by graph 44F occurs. The failure of the current interruption to move the condition of core 73 back to point 100 is termed a failure of the saturable reactor core 73 to "reset."

To prevent transiently excessive current half cycle 44F from occurring, it is necessary to operate the saturable reactor so that it remains in the saturated state under all conditions, including current interruptions 44E.

Figure 9:
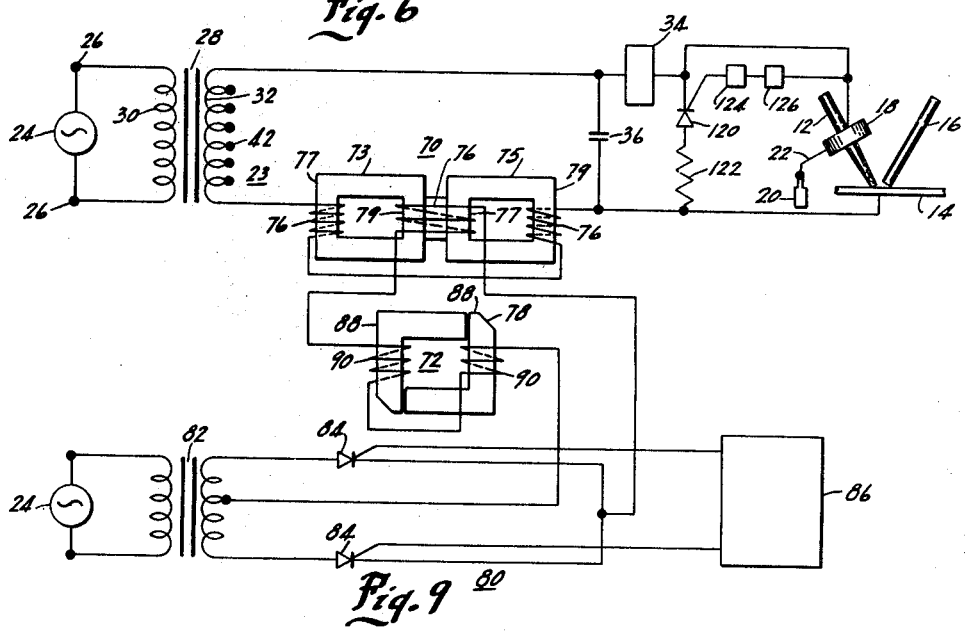
FIGURE 9 is a schematic diagram of an embodiment of the welding power supply of the present invention having a means to prevent current instabilities.

One means for so operating saturable reactor 70 is shown in FIGURE 9. The welding power supply 23 of that figure includes a controlled rectifier connected in parallel with electrodes 12 and work piece 14 in a manner to conduct current in the same direction in which it would flow from work piece 14 to electrode 12. This is the direction of rectification of the arc between the work piece and the electrode. A current limiting resistor 122 may be connected in series with controlled rectifier 120. In the event of a complete blocking of the current wave by the arc, controlled rectifier 120 may be rendered conductive to provide a current path parallel to the arc to allow the alternate half cycle of current 44B to flow through load windings 76 of saturable reactor 70 even though the arc is not ignited. This permits saturable reactor 70 to reset and prevents an excessive current half cycle 44F subsequent to an interruption 44E. The current conducted through controlled rectifier 120 need only be large enough to reset saturable reactor 70 and need not be of the full magnitude of half cycle 44C or 44D. Typically a current of 10 to 15 amperes will suffice. Controlled rectifier 120 is turned off by the subsequent half cycle 44A.

The conduction of control rectifier 120 is controlled by firing circuit 124 which, in turn, may be controlled by logic circuit 126. Logic circuit 126 may be a flip flop steered by a signal from half cycle 44A and triggered by the current interruption 44E so that if, after an alternate half cycle 44A, and alternate half cycle 44B does not occur, logic circuit 126 operates firing circuit 124 to fire controlled rectifier 120.

A break-over device such as a Shockley or Zener diode may be used in place of logic circuit 126. Thus, if the voltage between work piece 14 and electrode 12 begins to rise, due to the lack of an arc between the electrode and the work piece, the diode is broken over by such rising voltage and fires controlled rectifier 120.

Stability against excessive current due to such longer term factors as line voltage changes, or power supply warm up, may be provided by regulating the current of welding power supply 23. A welding power supply having a current regulating circuit is shown generally in FIGURE 11, and in detail in FIGURE 12. The regulating circuit 150 which, in this embodiment replaces firing circuit 86 of the embodiment of FIGURE 6 includes a current feedback signal means 152, a current reference signal means 154, and a balance circuit such as amplifier and firing circuit 156.

Current feedback signal means 152 may comprise a current transformer 158. An air gap 160 may be provided in current transformer 158 of sufficient width to lend linearity to the feedback signal produced by the transformer over the range of welding currents. In a typical embodiment, a 1/16 inch air gap is sufficient for this purpose.

Current reference signal means 156 may comprise an adjustable DC source such as battery 162 and rheostat 164. Both the signal in conductor 166 from current feedback signal means 152 and the signal in conductor 168 from current reference signal means 154 are applied to amplifier and firing circuit 156, the output of which in conductor 170 controls the operation of controlled rectifiers 84 so as to increase or decrease the current in control winding 76 of saturable reactor 70 depending on whether the actual welding current from welding power source 23, as represented by the feedback signal from means 152, is less than, or greater than, the desired welding current, as represented by the signal from current reference signal means 154.

Amplifier and firing circuit 156 is shown in detail in FIGURE 12 and comprises a differential amplifier 172 and a unijunction transistor relaxation oscillator 174. Differential amplifier 172 is employed, rather than a proportional amplifier, so as to provide large, forcing, signals in control winding 76 which overcome the inductance of the winding and improve the response of regulator 150.

The differential amplifier and oscillator are energized by a power supply comprised of transformer secondary winding 176, which receives alternating current from alternator 24 through the transformer primary winding (not shown), diodes 178, and break over diodes 180 and 182. Transformer secondary winding 176 and diodes 178 provide a fully rectified power to the amplifier and firing circuit 156 to energize the circuit and synchronize its operation to that of transformer 82 and rectifiers 84. Break over diodes provide bias voltages of the necessary polarity and magnitude to the remainder of the circuit. These voltages are insensitive to changes in the line voltage and hence stabilize control circuit 80 against such changes.

Differential amplifier 172 is comprised of two transistors 184 and 186 having their emitter and collector circuits connected in parallel across conductors 188 and 190. The base of transistor 184 is biased with adjustable voltage from voltage divider 192. The base of transistor 186 is biased with an error signal between a reference signal produced by voltage divider 194 and the feedback signal from current transformer 158. The signal from current transformer 158 is rectified by bridge 196 and filtered by capacitors 197 and 198. The signal from voltage divider 194 and the signal from current transformer 158 are supplied in opposing fashion to voltage divider 199 which supplies the error signal to the base of transistor 186 via conductor 200. Voltage divider 199 is adjustable to alter the operating point of transistor 186.

Unijunction transistor relaxation oscillator 174 includes unijunction transistor 202. The emitter circuit of transistor 202 includes a capacitor 204 which is charged by the signal in conductor 206 generated by resistor 208. Resistor 208 is connected to the collector of transistor 184. The base of transistor 202 is connected to the power supply and to the gate of pilot controlled rectifier 210.

Pilot controlled rectifier 210 is connected in the gate-cathode circuit of controlled rectifiers by conductors 211, 212, 213, and 214 so as to complete this circuit and apply firing signals to controlled rectifiers 84 when the pilot controlled rectifier is turned on.

In operation, when the feedback signal from current transformer 158 is equal to the reference signal produced by voltage divider 194, indicating that no additional welding current is required, transistor 186 is biased off by the error signal applied to voltage divider 199. Transistor 184 is biased on and conducts current from conductor 188 to conductor 190. No current is supplied to conductor 206 to charge capacitor 204 and render transistor 202 operative.

When, however, the feedback signal from current transformer 158 falls below the reference signal from voltage divider 194 by a very slight amount, transistor 186 is turned on and transistor 184 turned off. With transistor 184 off, a voltage signal is provided in conductor 206 which charges capacitor 204 and renders transistor 202 conductive. The signal from transistor 202 fires controlled rectifier 210 which, in turn, fires controlled rectifiers 84. The one of controlled rectifiers 84 properly biased for conduction will supply current to control winding 76 of saturable reactor 70 to increase the current in the control winding 76, reduce the impedance of saturable reactor 70, and increase the welding current. When the welding current has been restored to the desired value, the feedback signal from current transformer 158 again equals the reference signal so that transistor 186 is biased off and transistor 184 biased on and no firing signals are provided to controlled rectifiers 84.

I claim:

1. A welding power supply for producing a stable welding arc between a non-consumable electrode and a workpiece from an alternating current power source comprising:

supply means for providing an alternating current wave of alternately bi-directional half cycles to the electrode and the workpiece from the power source to form a welding arc, said electrode and workpiece being capable of blocking the current flow in one direction between the electrode and the workpiece;

a resettable variable impedance saturable reactor means having load windings connected to said supply means and to the electrode and workpiece to regulate the magnitude of said current wave, the blocking of current flow by said electrode and workpiece tending to prevent said saturable reactor means from resetting and driving said saturable reactor means into saturation upon the resumption of current regulation, thereby causing instabilities in said alternating current wave; and conductor means connected to said load windings and in parallel with said electrode and workpiece to conduct current flow through the load windings of said saturable reactor means when the electrode and workpiece block the current flow in one direction, so as to insure the resetting of said saturable reactor means under all operating conditions.

2. The welding power supply according to claim 1, wherein said conductor means includes a controllable unidirectional conduction device connected to and operated into the conductive state by a means responsive to the blocking of the current flow by the welding arc.

3. The welding power supply according to claim 2, wherein said means responsive to the blocking of the current flow by the welding arc comprises a means responsive to the voltage developed across the arc.

4. The welding power supply for producing a stable welding arc between a non-consumable electrode and a workpiece from an alternating current power source comprising:

supply means for providing an alternating current wave of alternately bi-directional half cycles to the electrode and the workpiece from the power source;

means connected to said supply means for altering the magnitude of said current wave;

feedback means connected to said supply means for sensing the magnitude of said current wave and providing a signal proportional thereto;

signal means providing a signal proportional to the desired magnitude of said current wave; and control means connected to said means for altering the magnitude of said current wave, said feedback means, and said signal means, and responsive to the difference between the signal from said feedback means and the signal from said signal means for operating said means for altering the magnitude of said current wave to bring the actual magnitude of said current wave into conformity with the desired magnitude of said current wave.

5. The welding power supply according to claim 4, wherein said feedback means comprises an air gap current transformer providing a signal linearly proportional to said current wave over a wide range of current magnitude.

6. The welding power supply according to claim 5, wherein said air gap current transformer includes an air gap of approximately one-sixteenth of an inch.

7. The welding power supply according to claim 4, wherein said control means includes a differential amplifier responsive to the signal difference between the signal from the feedback means and the signal from said signal means.

8. The welding power supply according to claim 7, wherein said means for altering the magnitude of said current wave employs controlled rectifiers to alter the current wave magnitude and said control means includes a pulse generating means operable by said differential amplifier for providing firing pulses to said controlled rectifiers for operating said means for altering the magnitude of said current wave to bring the actual magnitude of said current wave into conformity with the desired magnitude of said current wave.

9. The welding power supply of claim 1 including:
feedback means connected to said supply means for sensing the magnitude of said current wave and for providing a signal proportional thereto;
signal means for providing a signal proportional to the desired magnitude of said current wave; and
control means connected to said saturable reactor means, said feedback means, and said signal means, and responsive to the difference in the signal between the signal from said feedback means and the signal from said signal means for operating said saturable reactor to alter the magnitude of said current wave to bring the actual magnitude of said current wave into conformity with the desired magnitude of said current wave.

10. A method of producing a stable welding arc between a non-consumable electrode and a workpiece, said electrode and workpiece having the load windings of a resettable variable impedance saturable reactor means in series therewith for controlling the welding current, the method comprising the steps of:
impressing a current wave of alternately bi-directional half cycles between the electrode and workpiece to form the welding arc, the welding arc impeding or blocking current flow in one direction between the electrode and the workpiece, the blocking of the current flow in one direction tending to prevent the saturable reactor means from resetting and driving the saturable reactor means into saturation upon the resumption of current regulation thereby causing instabilities in the current wave; and
conducting current around the arc and through the load windings of the saturable reactor means in said one direction in the event the arc blocks said current flow, thereby to reset the saturable reactor means so that the saturable reactor means is not driven into saturation upon the resumption of current regulation.

11. The method according to claim 10 including the further step of regulating said alternating current wave to a desired magnitude by means of said saturable reactor means.

References Cited
UNITED STATES PATENTS

| | | | |
|---|---|---|---|
| 2,200,632 | 5/1940 | Mills | 219—131 X |
| 2,880,374 | 3/1959 | Mulder | 315—175 X |
| 2,834,917 | 5/1958 | Moignet | 315—176 |
| 3,150,312 | 9/1964 | Willecke et al. | 219—131 X |

JAMES W. LAWRENCE, Primary Examiner

C. R. CAMPBELL, Assistant Examiner

U.S. Cl. X.R.

219—131; 315—170, 200